(12) United States Patent
Shaw

(10) Patent No.: US 9,755,448 B2
(45) Date of Patent: Sep. 5, 2017

(54) LED LUMINAIRE WITH INTEGRATED BATTERY BACKUP

(71) Applicant: Revolution Lighting Technologies, Inc., Stamford, CT (US)

(72) Inventor: James Shaw, Plano, TX (US)

(73) Assignee: REVOLUTION LIGHTING TECHNOLOGIES, INC., Stamford, CT (US)

( * ) Notice: Subject to any disclaimer, the term of this patent is extended or adjusted under 35 U.S.C. 154(b) by 144 days.

(21) Appl. No.: 14/880,298

(22) Filed: Oct. 12, 2015

(65) Prior Publication Data

US 2016/0230973 A1 Aug. 11, 2016

Related U.S. Application Data

(60) Provisional application No. 62/062,588, filed on Oct. 10, 2014.

(51) Int. Cl.

| | | |
|---|---|---|
| *H02J 9/00* | (2006.01) |
| *F21S 9/02* | (2006.01) |
| *H02J 7/00* | (2006.01) |
| *H05B 33/08* | (2006.01) |
| *H02J 9/06* | (2006.01) |
| *F21S 8/02* | (2006.01) |
| *F21V 23/00* | (2015.01) |
| *F21Y 105/10* | (2016.01) |
| *F21Y 115/10* | (2016.01) |

(52) U.S. Cl.
CPC ............. *H02J 7/0047* (2013.01); *F21S 8/02* (2013.01); *F21S 9/022* (2013.01); *F21V 23/006* (2013.01); *H02J 9/061* (2013.01); *H05B 33/0842* (2013.01); *H05B 33/0884* (2013.01); *F21Y 2105/10* (2016.08); *F21Y 2115/10* (2016.08)

(58) Field of Classification Search
CPC .......... H02J 7/004; H02J 9/061; H02J 7/0068; H05B 33/0842; H05B 33/0884; F21S 8/02; F21S 9/022; F21V 23/023; F21Y 2105/10; F21Y 2115/10
See application file for complete search history.

(56) References Cited

U.S. PATENT DOCUMENTS

| | | | |
|---|---|---|---|
| 5,661,645 A | 8/1997 | Hochstein | |
| 9,004,713 B2 * | 4/2015 | Mandy | B66B 11/0233 362/147 |
| 2012/0098655 A1 * | 4/2012 | Preta | B60Q 1/0023 340/438 |
| 2014/0268747 A1 * | 9/2014 | Demuynck | F21S 9/022 362/235 |

* cited by examiner

*Primary Examiner* — Peggy Neils
(74) *Attorney, Agent, or Firm* — Barlow, Josephs & Holmes, Ltd.

(57) ABSTRACT

An LED luminaire with an integrated battery backup is divided into a hidden infrastructure portion and a decorative body portion. The luminaire body has a main lighting deck with at least one LED mounted thereon and a decorative skirt extending from the main lighting deck. A diffuser panel is received over the main lighting deck. The hidden infrastructure portion includes a light fixture housing configured and arranged to be mounted within a building infrastructure, an emergency battery backup assembly received within the light fixture housing wall, and a housing fixture bracket secured within the light fixture housing to support the emergency backup assembly in the upper portion of the light fixture housing.

15 Claims, 5 Drawing Sheets

LED LUMINAIRE WITH INTEGRATED BATTERY BACKUP

CROSS-REFERENCE TO RELATED APPLICATIONS

The present application is a non-provisional of, and claims the benefit of, U.S. Provisional Application No. 62/062,588 filed Oct. 10, 2014, the entire contents of which are incorporated by reference.

BACKGROUND OF THE INVENTION (1) Field of the Invention

The instant invention relates to LED luminaires and more specifically to an LED luminaire with an integrated battery backup.

(2) Description of Related Art

Most commercial building codes require that lighting systems have emergency egress lights with a battery backup power supply. However, many of the available devices typically mount the battery backup within the visible, body portion of the luminaire itself, resulting in a bulky and unattractive luminaire body portion.

Accordingly, there is a need in the industry for a luminaire unit where the battery backup assembly is not mounted within the luminaire body itself so that the unit can be more attractively designed.

SUMMARY OF THE INVENTION

This industry need is met by the present disclosure which provides a luminaire unit with an integrated battery backup assembly that is received and secured within the hidden light fixture housing mounted within the building infrastructure. This integrated design provides for a discreet battery backup and a luminaire body unit that is more attractive.

In an exemplary embodiment the LED luminaire is divided into a decorative body portion and a hidden infrastructure portion. More specifically, the LED luminaire comprises a luminaire body having a main lighting deck and a decorative skirt extending from the main lighting deck. At least one LED is mounted on the main lighting deck of the luminaire body, but in most embodiments, a plurality or LEDs will be arranged in an array on the main lighting deck. A diffuser panel is received and secured in interfitting relation over the main lighting deck to diffuse and soften the light emitting from the LED array. The decorative luminaire body and the diffuser panel are contoured to resemble the appearance of a recessed light fixture and flood bulb.

An LED driver module is mounted on a rear surface of the main lighting deck of the luminaire body and is connected to the LED array. The LED driver module has a normal power supply input and is configured to control delivery of power from the normal power supply input to the LED array. Power from the normal power supply input can be switched or continuous.

The hidden infrastructure portion of the luminaire includes a light fixture housing configured and arranged to be mounted within a building infrastructure, an emergency battery backup assembly, and a housing fixture bracket which supports the emergency battery backup assembly within the light fixture housing.

The light fixture housing has a top wall and downwardly extending sidewalls forming an internal cavity which is deeper than a conventional junction box to accommodate the emergency battery backup assembly. The emergency battery backup assembly is received within an upper portion of the internal cavity of the light fixture housing adjacent the top wall.

The emergency battery backup assembly includes a backup battery, and an emergency light control module connected between the backup battery and the LED array. The emergency light control module has an emergency power supply input which is active when the normal power supply is not available. The emergency backup components are mounted on an upper surface of the housing fixture bracket and the bracket is secured within the light fixture housing to position the emergency backup assembly in the upper portion of the internal cavity.

The luminaire body is assembled in interfitting relation with the light fixture housing where the rear surface of the main lighting deck of the luminaire body is received in adjacent relation with terminal edges of said sidewalls. More specifically, two mounting screws extend downwardly from the fixture housing and the main lighting deck includes two mounting slots which rotatably receive the heads of the mounting screws.

In operation, the emergency light control module charges the backup battery when power is available from the normal power supply or the emergency power supply. Once charged, the LED driver module and the emergency light control module cooperate to provide power to the LED array from the normal power supply when the normal power supply is available, from the emergency power supply when the normal power supply is not available, and from the backup battery when neither of the normal power supply and the emergency power supply are available.

It is contemplated that the LED driver module could also be located with the emergency battery backup assembly to further simplify the decorative luminaire body structure.

The LED luminaire further includes a battery status indicator LED mounted on the main lighting deck of the luminaire body. The battery status indicator LED is electrically connected to the emergency light control module wherein the emergency light control module is operative for operating the battery status indicator LED in at least charging mode and a charged mode.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
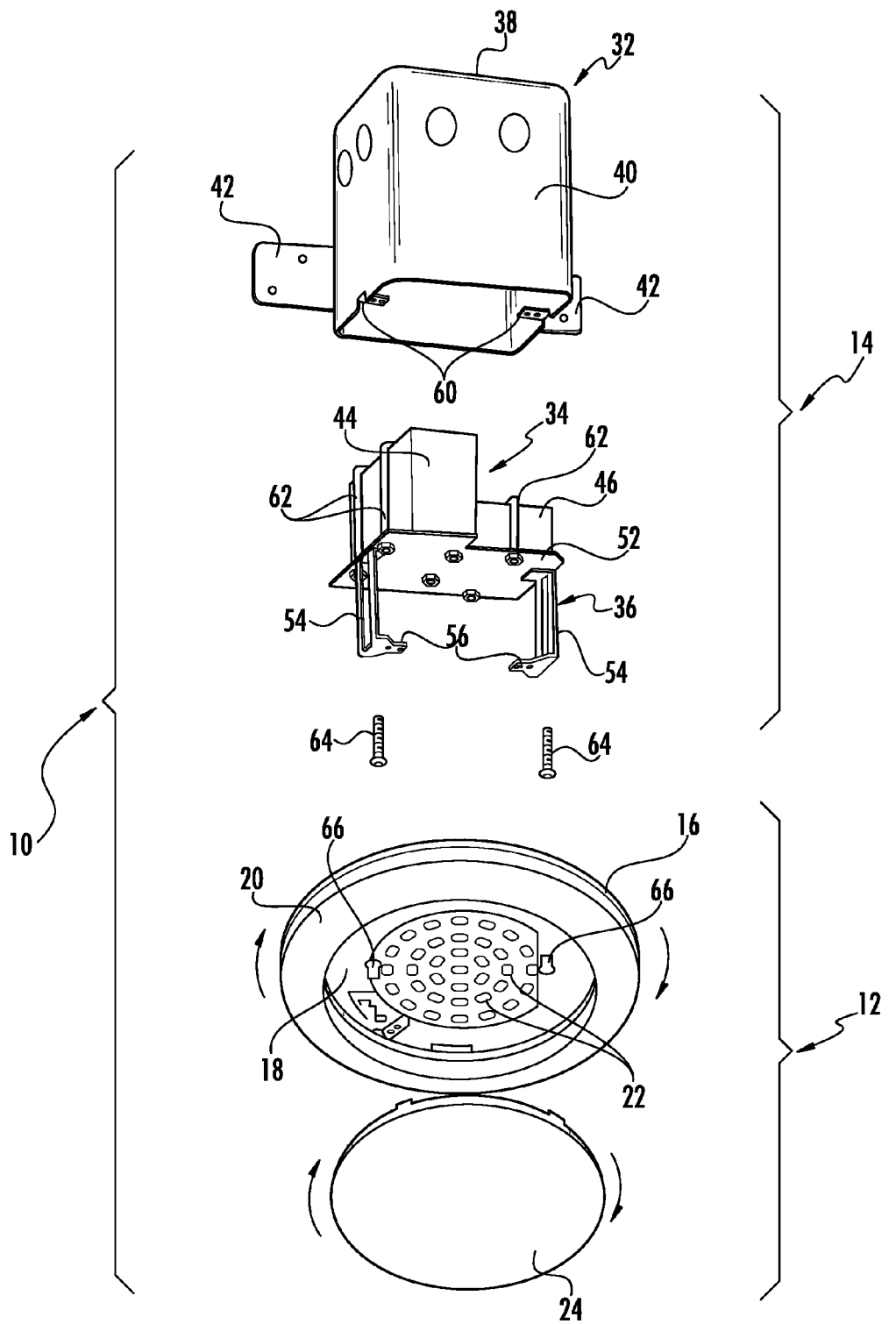
FIG. 1 is an exploded perspective view of an exemplary embodiment.
Figure 2:
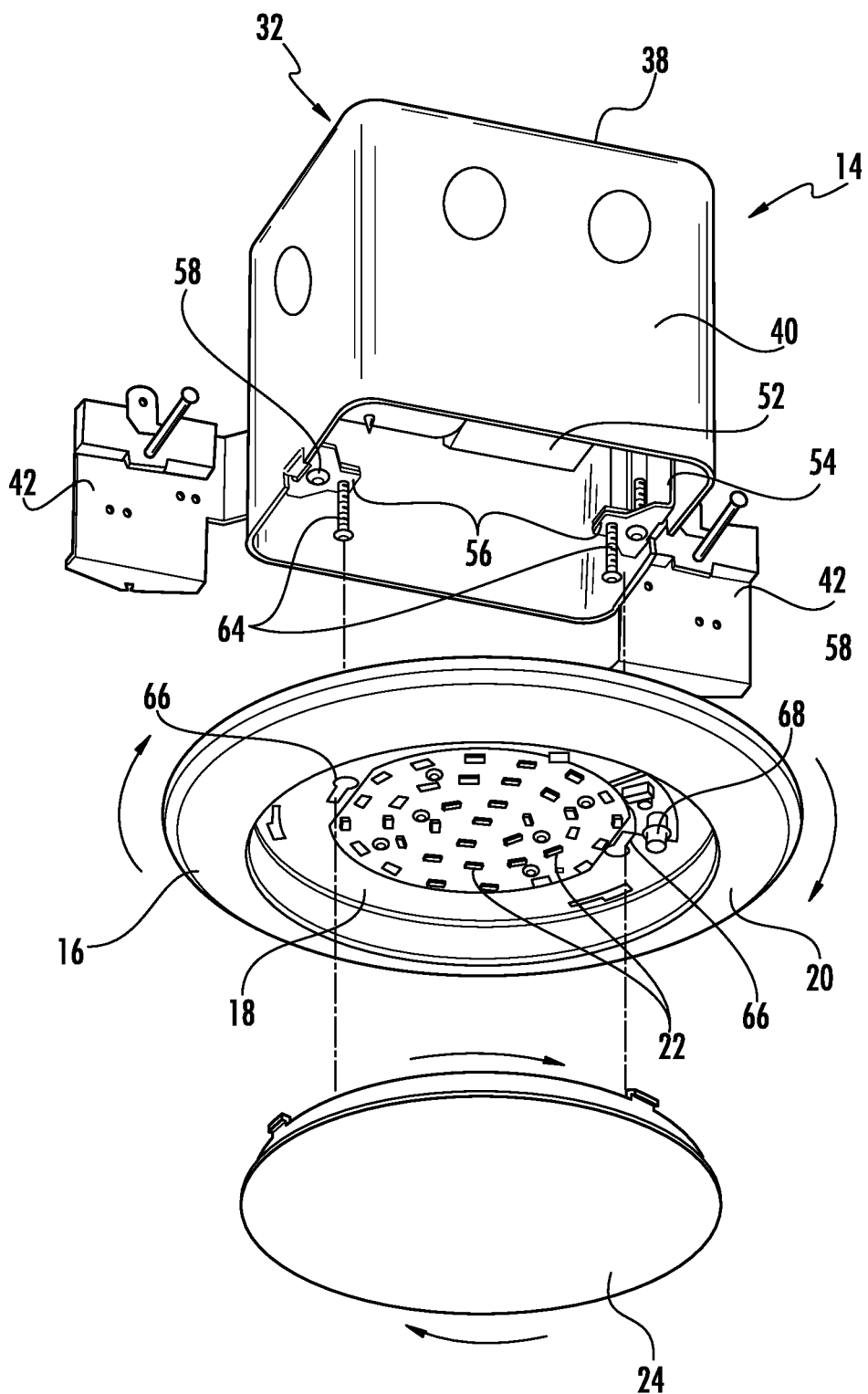
FIGS. 2 and 3 partially assembled views thereof.
Figure 3:
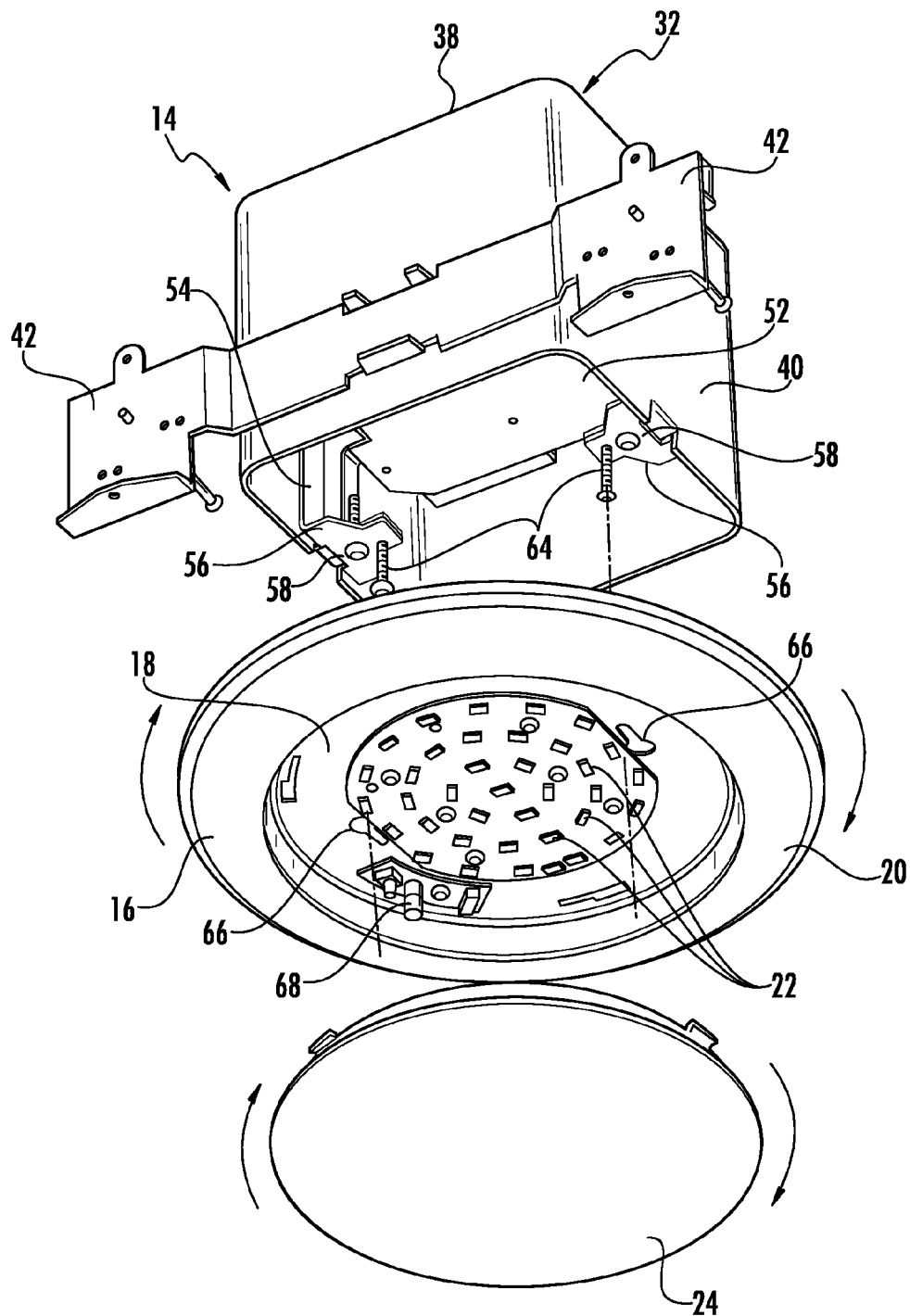

Referring now to the drawings, an exemplary embodiment of the invention is generally indicated at 10 in FIGS. 1-5.

In the exemplary embodiment, the LED luminaire 10 is divided into a decorative body portion generally indicated at 12 and a hidden infrastructure portion generally indicated at 14. More specifically, the LED luminaire 10 comprises a luminaire body 16 having a main lighting deck 18 and a decorative skirt 20 extending from the main lighting deck 18. At least one LED 22 is mounted on the main lighting deck 18 of the luminaire body 16, but in most embodiments, a plurality or LEDs 22 will be arranged in an array on the main lighting deck 18. A diffuser panel 24 is received and secured in interfitting relation over the main lighting deck 18 to diffuse and soften the light emitted from the LED array 22. The exemplary embodiment illustrates a twist mount arrangement. The decorative luminaire body 16, skirt 20 and the diffuser panel 24 are contoured to resemble the appearance of a recessed light fixture trim and flood bulb.

An LED driver module 26 is mounted on a rear surface of the main lighting deck 18 of the luminaire body 16 and is connected (see 27 in FIG. 5) to the LED array 22. The LED driver module 26 has a normal power supply input 28 and is configured to control delivery of power from the normal power supply 30 to the LED array 22. Power from the normal power supply input 28 can be switched or continuous.

The hidden infrastructure portion 14 of the luminaire 10 includes a light fixture housing generally indicated at 32 configured and arranged to be mounted within a building infrastructure (not shown), an emergency battery backup assembly generally indicated 34, and a housing fixture bracket 36 which supports the emergency battery backup assembly 34 within the light fixture housing 32.

The light fixture housing 32 has a top wall 38 and downwardly extending sidewalls 40 forming an internal cavity which is deeper than a conventional junction box to accommodate the emergency battery backup assembly 34. The emergency battery backup assembly 34 is received within an upper portion of the internal cavity of the light fixture housing 32 adjacent the top wall 38. The light fixture housing 32 further includes opposed mounting brackets 42 for mounting the housing 32 to ceiling joists or other building infrastructure.

Figure 4:
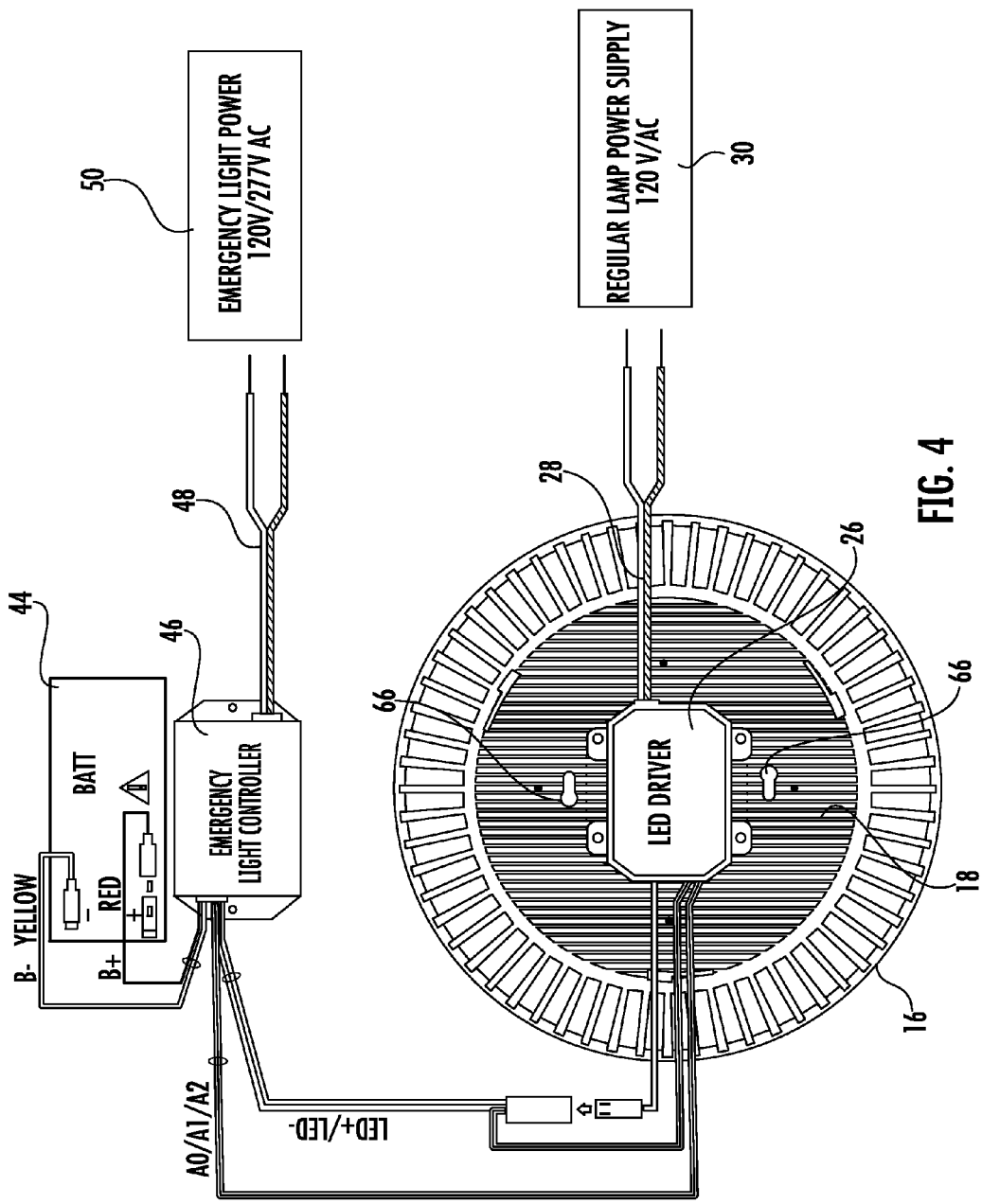
FIG. 4 is a rear plan view thereof including wiring connections.
Figure 5:
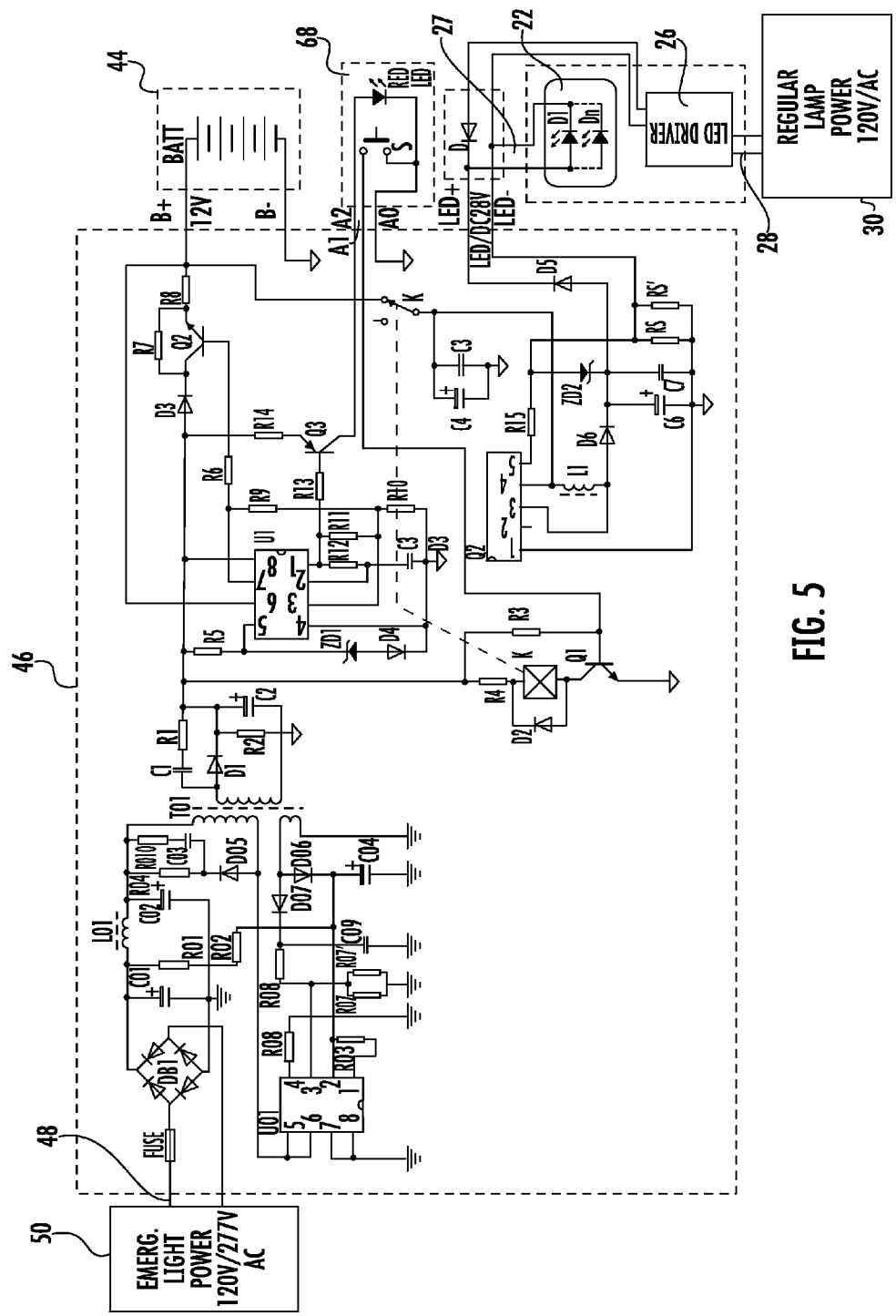
FIG. 5 is a schematic wiring diagram of the electronic components thereof.

The emergency battery backup assembly 34 includes a backup battery 44, and an emergency light control module 46 connected between the backup battery 44 (B+/B− FIGS. 4 and 5) and the LED Driver 26 and LED array 22 (LED+/LED− FIGS. 4 and 5). The backup battery 44 is sized to fit the space requirements within the light fixture housing 32. The emergency light control module 46 has an emergency power supply input 48 that is separately connected to an emergency power supply 50 and which is active when the normal power supply 30 is not available.

The light fixture bracket 36 comprises a main deck plate 52 configured to fit within the inner dimensions of the light fixture housing 32, and opposing support arms 54 extending downwardly from a bottom surface of the deck plate 52. Each of the support arms 54 includes an inwardly turned mounting flange 56. The emergency backup components (battery 44 and module 46) are mounted on an upper surface of the deck plate 52 and the bracket 36 is secured within the light fixture housing 32 to position the emergency backup assembly 34 in the upper portion of the internal cavity of the housing. The bracket 36 is secured to the housing 32 by two screws 58 which are received through the flanges 56 and into mating tabs 60 turned inwardly from the sidewalls 40 of the housing 32. The battery 44 and module 46 are illustrated as being secured with clamp bars 62, however, it should be understood that these components can be secured in a variety of ways to the deck plate 52.

The luminaire body 16 is assembled in interfitting relation with the light fixture housing 32 and bracket 36 where the rear surface of the main lighting deck 18 is received in adjacent relation with terminal edges of said sidewalls 40. More specifically, two mounting screws 64 extend downwardly from the fixture bracket flanges 56 and the main lighting deck includes two arcuate mounting slots 66 which rotatably receive the heads of the mounting screws 64.

The LED luminaire further includes a battery status indicator LED 68 mounted on the main lighting deck 18 of the luminaire body 16. The battery status indicator LED 68 is electrically connected (A0/A1/A2 FIGS. 4 and 5) to the emergency light control module 46 wherein the emergency light control module 46 is operative for operating the battery status indicator LED 68 in at least charging mode and a charged mode.

In operation, the emergency light control module 46 charges the backup battery 44 when power is available from the normal power supply 30 or the emergency power supply 50. Once charged, the LED driver module 26, the emergency light control module 46 and the battery 44 cooperate to provide power to the LED array from the normal power supply 30 when the normal power supply is available, from the emergency power supply 50 when the normal power supply is not available, and from the backup battery 44 when neither of the normal power supply 30 and the emergency power supply 50 are available.

It is contemplated that the LED driver module 26 could also be integrated and located with the emergency battery backup assembly 34 to further simplify the decorative luminaire body structure 16.

It can therefore be seen that the exemplary embodiment provides a unique and novel luminaire unit having an integrated battery backup assembly that is received and secured within the hidden light fixture housing mounted within the building infrastructure. This design provides for a discreet battery backup and a luminaire body that is more attractively designed and more aesthetically similar to existing recessed lighting fixtures.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:
1. An LED luminaire comprising:
a luminaire body;
at least one LED mounted on said luminaire body;
an LED driver module connected to said at least one LED, said LED driver module having a normal power supply input and being configured to control delivery of power from said normal power supply input to said at least one LED;
a light fixture housing configured and arranged to be mounted within a building infrastructure;
an emergency battery backup assembly received within said light fixture housing, said emergency battery backup assembly including a backup battery, and an emergency light control module connected between said backup battery and said at least one LED, said emergency light control module including an emergency power supply input;

a housing fixture bracket, said emergency backup assembly mounted on said housing fixture bracket, said housing fixture support bracket being secured within said light fixture housing, said luminaire body being removably assembled in interfitting relation with said light fixture housing, said emergency light control module charging said backup battery when power is available from said normal power supply or said emergency power supply, said LED driver module, said emergency light control module and said backup battery cooperating to provide power to said at least one LED from said normal power supply when said normal power supply is available, from said emergency power supply when said normal power supply is not available, and from said backup battery when neither of said normal power supply and said emergency power supply are available.

2. The LED luminaire of claim 1 wherein said luminaire body has a main lighting deck and a decorative skirt extending from said main lighting deck.

3. The LED luminaire of claim 2 further comprising a diffuser panel received and secured in interfitting relation over said main lighting deck.

4. The LED luminaire of claim 1 wherein LED driver module is mounted on said luminaire body.

5. The LED luminaire unit of claim 2 wherein LED driver module is mounted on said luminaire body.

6. The LED luminaire unit of claim 3 wherein LED driver module is mounted on said luminaire body.

7. The LED luminaire of claim 1 wherein said light fixture housing has a top wall and downwardly extending sidewalls forming an internal cavity.

8. The LED luminaire of claim 7 wherein said housing fixture support bracket is removably secured within said light fixture housing.

9. The LED luminaire of claim 7 wherein said housing fixture support bracket is secured within said light fixture housing to position said emergency backup assembly in said upper portion of said internal cavity.

10. The LED luminaire of claim 1 further including a battery status indicator LED mounted on said luminaire body, said battery status indicator LED being electrically connected to said emergency light control module wherein said emergency light control module is operative for operating said battery status indicator LED in at least charging mode and a charged mode.

11. An LED luminaire comprising:
a luminaire body having a main lighting deck;
at least one LED mounted on said main lighting deck of said luminaire body;
a diffuser panel received and secured in interfitting relation over said main lighting deck;
an LED driver module mounted on a rear surface of the main lighting deck of the luminaire body and connected to said at least one LED, said LED driver module having a normal power supply input and being configured to control delivery of power from said normal power supply input to said at least one LED;

a light fixture housing configured and arranged to be mounted within a building infrastructure, said light fixture housing have a top wall and downwardly extending sidewalls forming an internal cavity;

an emergency battery backup assembly received within an upper portion of said internal cavity of said light fixture housing adjacent said top wall, said emergency battery backup assembly including a backup battery, and an emergency light control module connected between said backup battery and said at least one LED, said emergency light control module including an emergency power supply input;

a housing fixture bracket, said emergency backup assembly mounted on said housing fixture bracket, said housing fixture support bracket being secured within said light fixture housing to position said emergency backup assembly in said upper portion of said internal cavity, said luminaire body being assembled in interfitting relation with said light fixture housing wherein said rear surface of said main lighting deck of said luminaire body is received in adjacent relation with terminal edges of said sidewalls, said emergency light control module charging said backup battery when power is available from said normal power supply or said emergency power supply, said LED driver module, said emergency light control module and said backup battery cooperating to provide power to said at least one LED from said normal power supply when said normal power supply is available, from said emergency power supply when said normal power supply is not available, and from said backup battery when neither of said normal power supply and said emergency power supply are available.

12. The LED luminaire of claim 11 further including a battery status indicator LED mounted on said luminaire body, said battery status indicator LED being electrically connected to said emergency light control module wherein said emergency light control module is operative for operating said battery status indicator LED in at least charging mode and a charged mode.

13. The LED luminaire of claim 11 wherein said luminaire body and said diffuser panel are contoured to resemble the appearance of a recessed light fixture and bulb.

14. The LED luminaire of claim 11 wherein said luminaire body has a decorative skirt extending from said main lighting deck.

15. The LED luminaire of claim 13 wherein said luminaire body has a decorative skirt extending from said main lighting deck.

* * * * *